(12) United States Patent
Schemmel et al.

(10) Patent No.: US 9,149,008 B1
(45) Date of Patent: Oct. 6, 2015

(54) PLANT SUPPORT APPARATUS

(71) Applicants: David Louis Schemmel, Rockford, MI (US); Jayne Collins Schemmel, Rockford, MI (US)

(72) Inventors: David Louis Schemmel, Rockford, MI (US); Jayne Collins Schemmel, Rockford, MI (US)

(73) Assignee: JAYDA, LLC, Rockford, MI (US)

( * ) Notice: Subject to any disclaimer, the term of this patent is extended or adjusted under 35 U.S.C. 154(b) by 303 days.

(21) Appl. No.: 13/732,423

(22) Filed: Jan. 1, 2013

Related U.S. Application Data

(60) Provisional application No. 61/582,403, filed on Jan. 2, 2012.

(51) Int. Cl.
*A01G 17/06* (2006.01)
*A01G 9/12* (2006.01)

(52) U.S. Cl.
CPC . *A01G 9/12* (2013.01); *A01G 17/06* (2013.01)

(58) Field of Classification Search
CPC ....... A01G 9/122; A01G 9/124; A01G 9/126; A01G 9/12; A01G 9/16; A01G 9/128; A01G 17/06; A01G 17/08; A01G 17/04; A01G 13/0243
USPC ......... 47/44–47; 211/194–208; 248/370–371; 248/156, 188.2; 108/53.1
See application file for complete search history.

(56) References Cited

U.S. PATENT DOCUMENTS

| | | | |
|---|---|---|---|
| 4,005,548 A | 2/1977 | Nahon | |
| 4,537,376 A * | 8/1985 | Buku | 248/97 |
| D341,687 S | 11/1993 | Park | |
| 5,640,802 A | 6/1997 | Elliott | |
| D426,399 S | 6/2000 | Yi et al. | |
| D505,030 S | 5/2005 | Heath et al. | |
| D521,205 S | 5/2006 | Fan | |
| 7,296,699 B2 * | 11/2007 | Hung et al. | 211/189 |
| D579,230 S | 10/2008 | Denham | |
| D666,464 S | 9/2012 | Austin | |
| 2012/0017501 A1 * | 1/2012 | Koopmeiners | 47/45 |
| 2012/0144737 A1 | 6/2012 | Austin | |

* cited by examiner

*Primary Examiner* — Joshua Huson
(74) *Attorney, Agent, or Firm* — Remarck Law Group PLC

(57) ABSTRACT

A plant support apparatus and related method for supporting a plant are disclosed. The plant support apparatus includes a first support layer including a first plurality of support arms having first ends and second ends. The first ends are coupled at a corresponding plurality of first support junctions and the second ends are coupled at a corresponding plurality of second support junctions. A second support layer includes a second plurality of support arms having first ends and second ends. The first ends are coupled at a corresponding plurality of third support junctions and the second ends are coupled at a corresponding plurality of fourth support junctions. The second and third support junctions are selectively coupled for concurrent movement. Subsequent layers of support are sequentially added to accommodate and support the plant as it grows.

7 Claims, 9 Drawing Sheets

PLANT SUPPORT APPARATUS

CROSS-REFERENCE TO RELATED APPLICATION

This application claims priority to U.S. Provisional Application No. 61/582,403, filed Jan. 2, 2012. The entire disclosure of the above application is expressly incorporated herein by reference.

FIELD

The present disclosure relates generally to agriculture and more particularly to a frame apparatus for structurally and adjustably supporting a plant as it grows laterally and vertically.

BACKGROUND

This section provides background information related to the present disclosure and is not necessarily prior art. Plants grow in many shapes and sizes. With some plants it may be desirable to provide an adjacent or surrounding structure such as a stake, cage or trellis for the plant to grow onto. The adjacent structure can assist and progressively support the plant as it grows. The technique of staking plants is particularly common in fruit bearing plants. In this regard, the plant and fruit can grow onto and around the stake or cage thereby keeping most of the plant and fruit off the ground. When plants are supported in an upright position, the plant is provided with increased area to prosper. In addition, may other advantages can be realized such as, but not limited to, ease of harvesting the fruit and spraying for insects.

In some instances however implementing a stake, cage or trellis relative to a plant can be time consuming and inefficient. For example, these conventional supporting techniques can be difficult to adjust as the plant grows. Additionally, sometimes it may be difficult to initially set up a support around a plant. Often, as with a trellis or other system, it becomes necessary to individually plant and design a support system and technique that is unique for each plant and/or growing season. Current systems do not allow a grower to easily accommodate for increased size of the plant as it progressively grows. In this manner, the size and shape of the selected support system decided upon and implemented at planting must remain the support system through the life of the plant.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
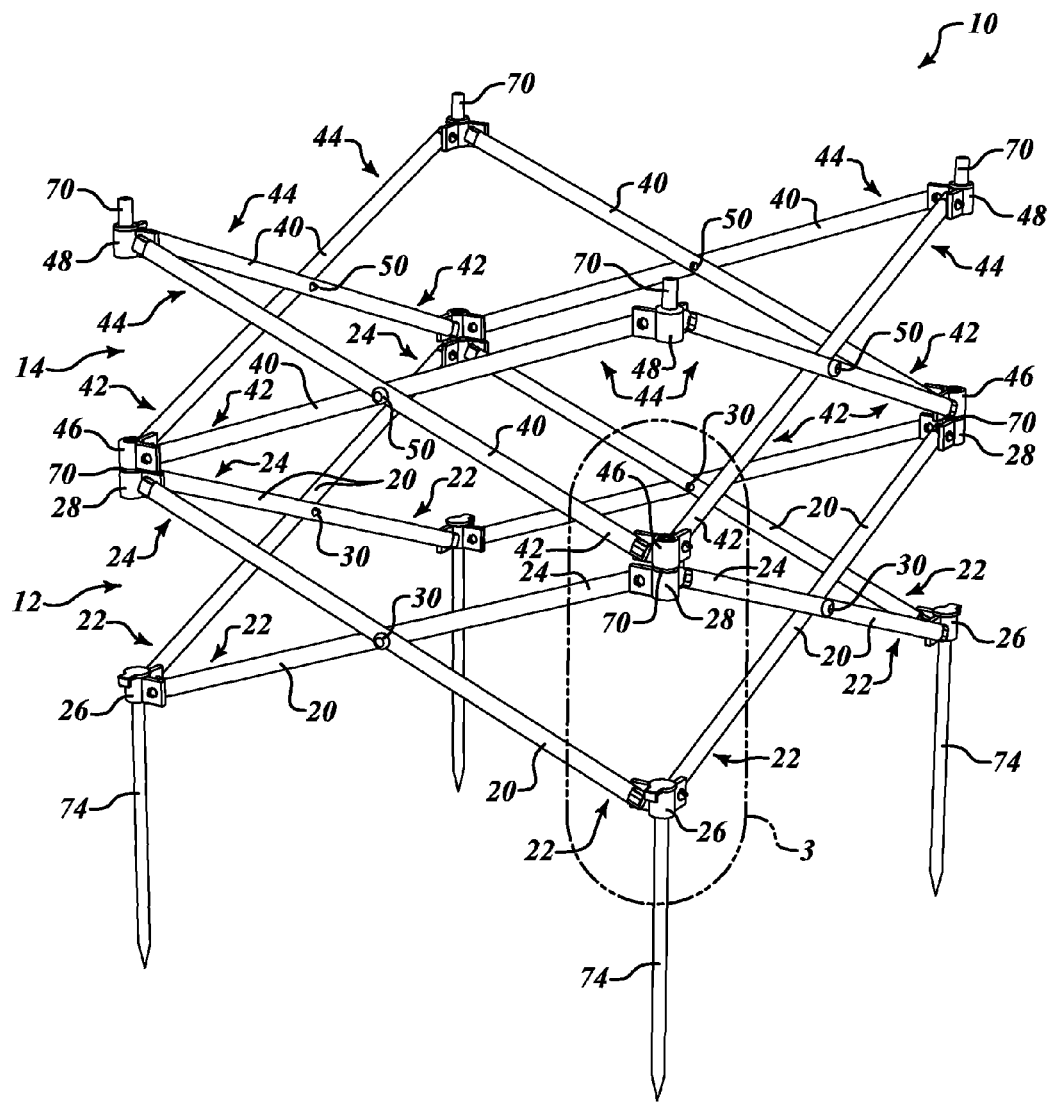
FIG. 1 is a front view of a plant support apparatus constructed in accordance to one example of the present teachings.
Figure 2:
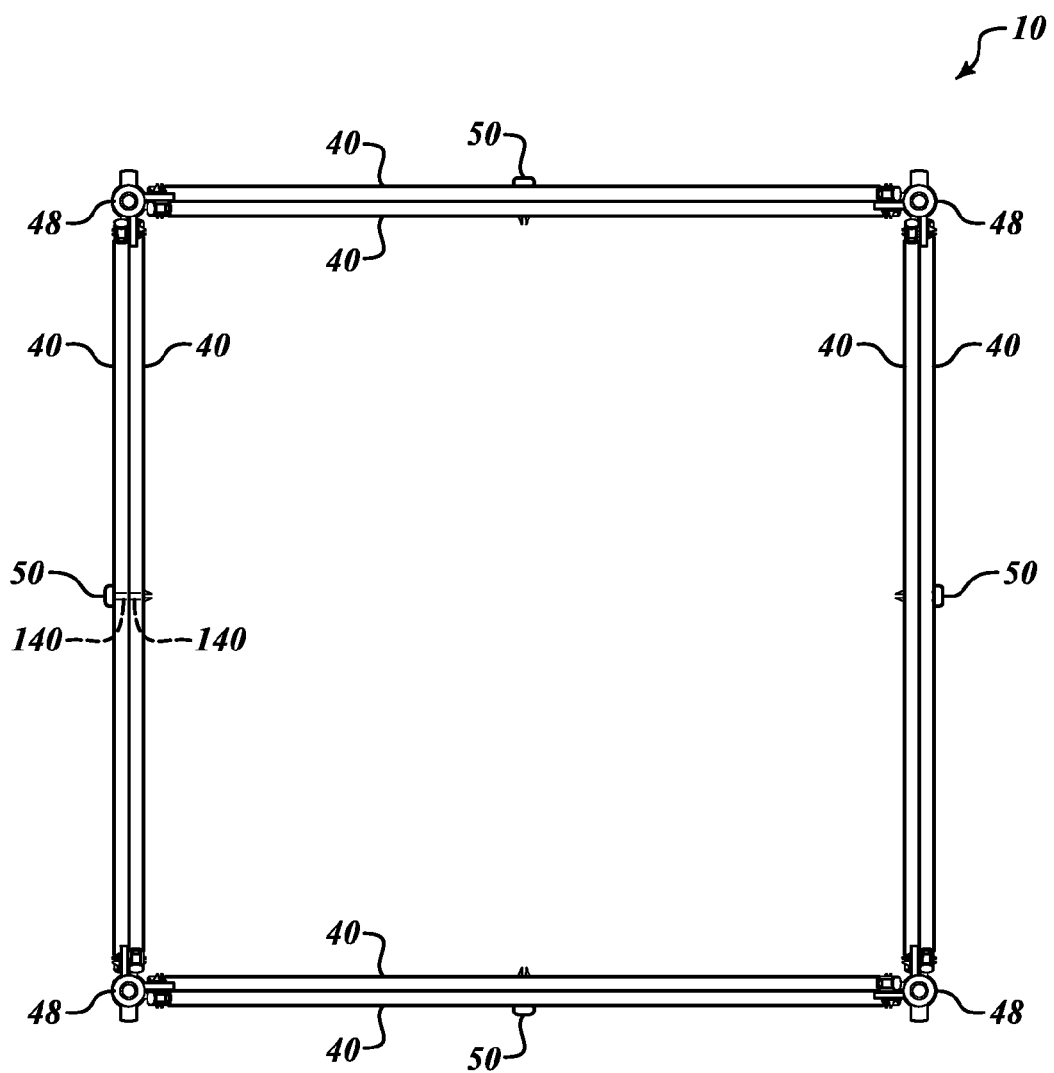
FIG. 2 is a top view of the plant support apparatus of FIG. 1.

With initial reference to FIGS. 1 and 2, a plant support apparatus constructed in accordance to one example of the present teaching is shown and generally identified at reference numeral 10. As will become appreciated from the following discussion, the plant support apparatus 10 can be adapted for providing one or multiple support levels according to the needs of a particular application. In this regard, the plant support apparatus 10 can sequentially and progressively accommodate additional levels of support as the plant it supports outgrows a given layer. The plant support apparatus 10 can also be adjusted radially to accommodate a desired circumference of a particular plant. The following discussion and related Figures are directed to using the plant support apparatus for supporting a tomato plant. It will be appreciated however that the plant support apparatus 10 is not so limited and can be used to support any plant.

The plant support apparatus 10 as shown in FIGS. 1 and 2 comprises a first support layer 12 and a second support layer 14. Again, it is appreciated that the plant support apparatus 10 can be modified to add additional layers as desired. For discussion purposes it will be understood that each support layer 12, 14 may be comprised of like components stacked on top of each other. The first support layer 12 and the second support layer 14 of the plant support apparatus 10 have ornamental aspects separate and apart from the functional characteristics described herein.

The first support layer 12 generally comprises a first plurality of support arms 20 each having first ends 22 and second ends 24. Adjacent first ends 22 are pivotally coupled to first support junctions 26. Adjacent second ends 24 are pivotally coupled to second support junctions 28. Pivot joints 30 are arranged at midpoints of corresponding first support arms 20. In the example provided, eight first support arms 20, four first support junctions 26, four second support junctions 28 and four pivot joints 30 are provided. It will be appreciated however that the first support layer 12 (and subsequent support layers 14, etc.) may be adapted to accommodate other amounts of components within the scope of this disclosure. While identified as "first" and "second" support junctions 26 and 28, the first and second support junctions are identical.

The second support layer 14 generally comprises a second plurality of support arms 40 each having first ends 42 and second ends 44. Adjacent first ends 42 are pivotally coupled to third support junctions 46. Adjacent second ends 44 are pivotally coupled to fourth support junctions 48. The pivot joints 30 are arranged at midpoints of corresponding first support arms 46. In the example provided, eight second support arms 40, four third support junctions 46, four fourth support junctions 48 and four pivot joints 30 are provided. Again, other amounts may be used. While identified as "third" and "fourth" support junctions 46 and 48, the third and fourth support junctions 46 and 48 are identical. Moreover, as will become appreciated herein, the components of the first support layer 12 and the second support later 14 are identical. The second (and first) plurality of support arms 40 (20) can be oblong in cross section. The geometry can provide an increased durability.

The first and second support arms 20, 40 can be formed of and/or include a rigid lightweight, biodegradable material such as natural fiber. The natural fiber may be molded, extruded or otherwise shaped into longitudinal arms or posts. The first and second support arm 20 and 40 can be "green" and eco-friendly. In other examples, the support arms 20 and 40 may be formed of different material such as plastic or aluminum. Other materials are contemplated.

Figure 3:
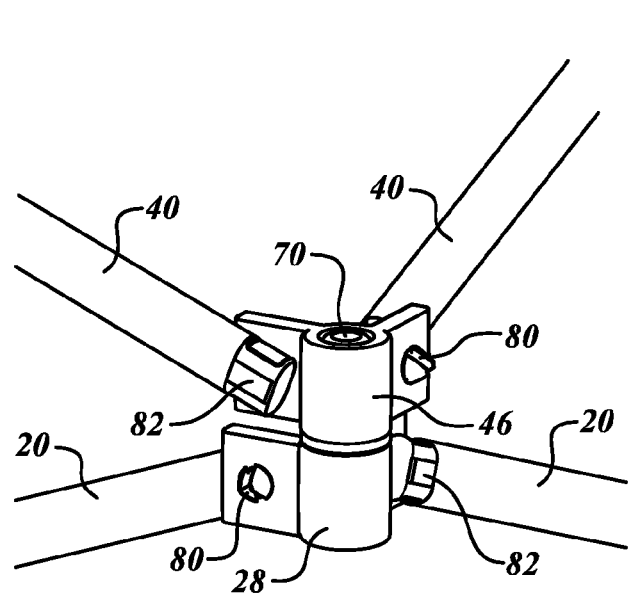
FIG. 3 is a front perspective view of an upper portion of the plant support of FIG. 1 illustrating a close-up of a first support junction.
Figure 3:
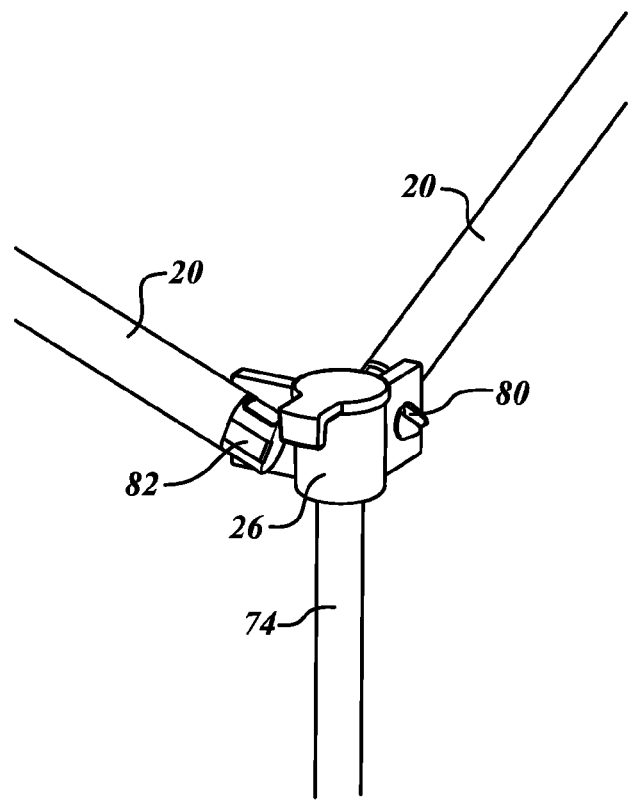
Figure 4:
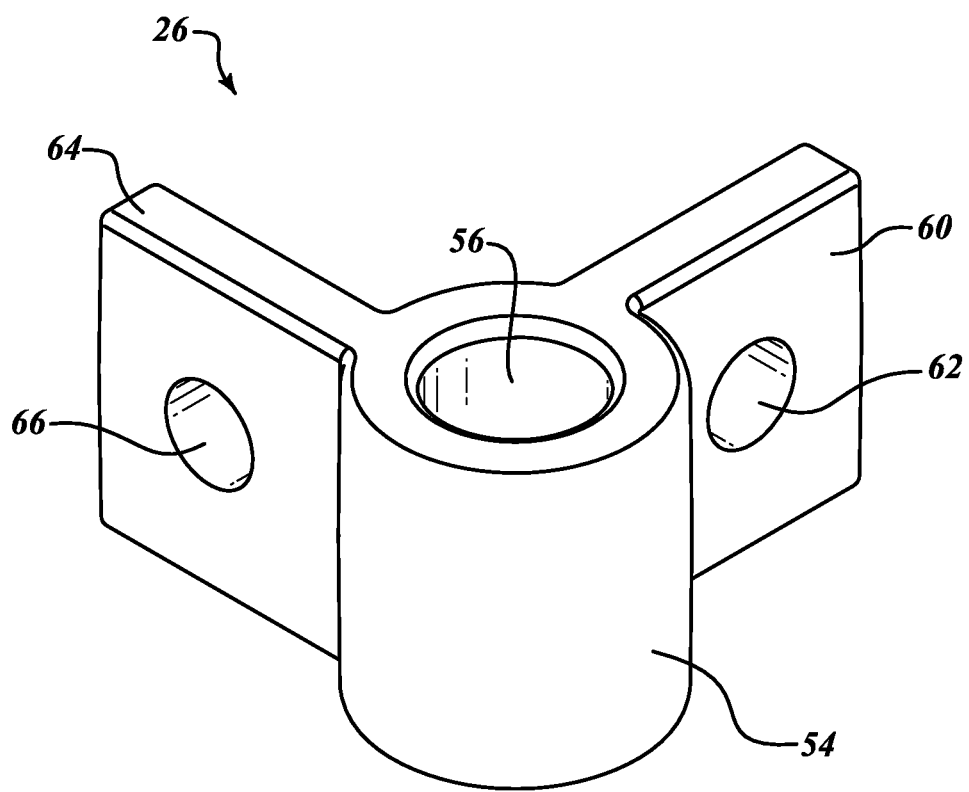
FIG. 4 is a front perspective view of a support junction of the plant support apparatus.
Figure 5:
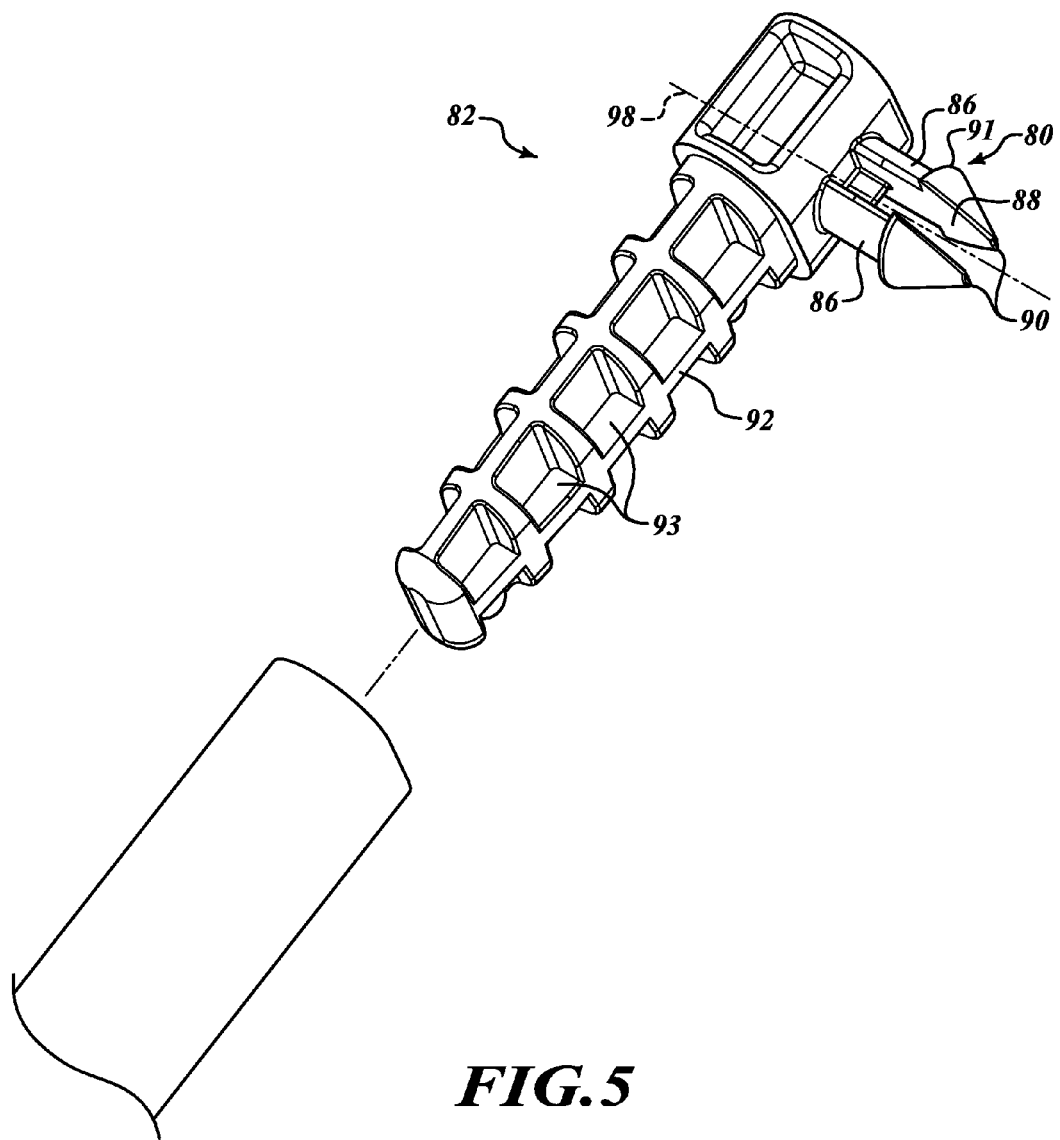
FIG. 5 is a side perspective view of an end cap of the plant support apparatus.
Figure 6:
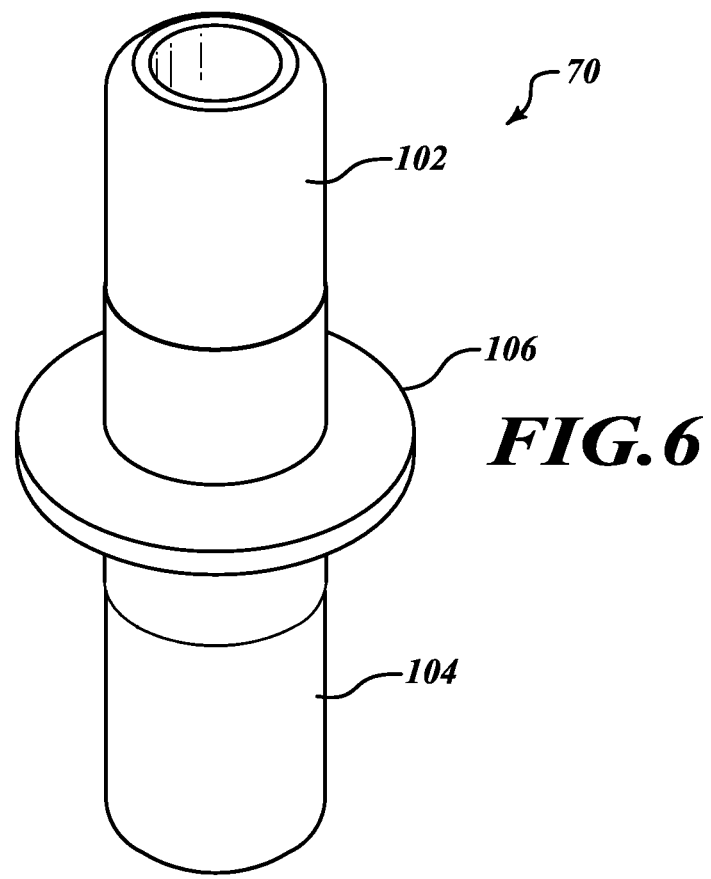
FIG. 6 is a side perspective view of a connector pin of the plant support apparatus.
Figure 7:
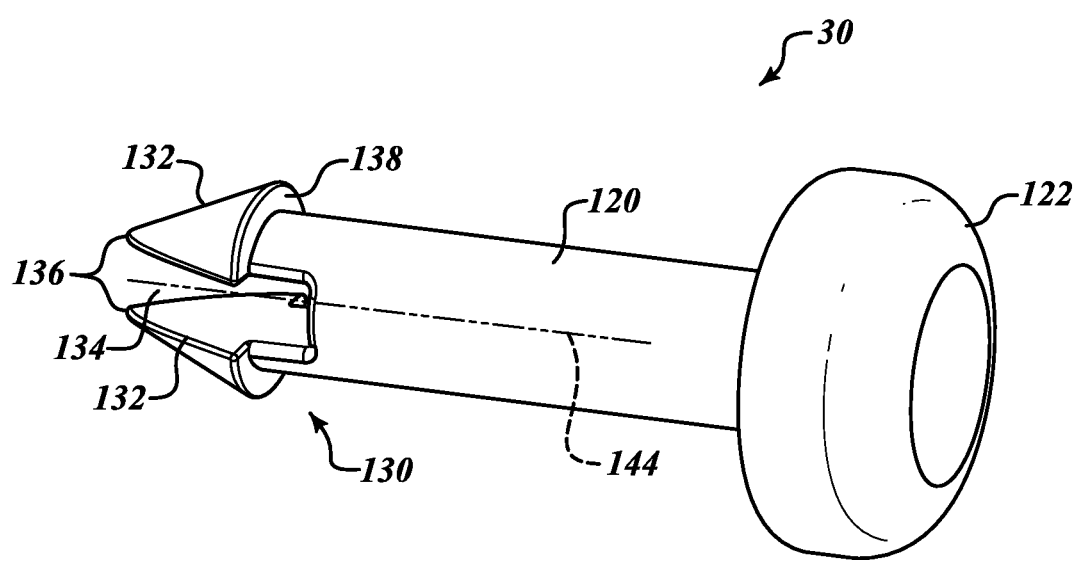
FIG. 7 is a side perspective view of a pivot pin of the plant support apparatus.

With additional reference now to FIGS. 3 and 4, additional features of the plant support apparatus 10 will be described. As shown in FIG. 3, each first support junction 26 generally includes a main body 54 that defines a cannulation 56. The main body 54 can further include a first flange 60 that defines a first aperture 62 and a second flange 64 that defines a second aperture 66. The first and second flanges 60 and 64 can be perpendicular to each other.

Each first support junction 26 (and second, third and fourth support junction 28, 46 and 48) is configured to accommodate a connector pin 70 or a stake 74 at the cannulation 56. Explained further, a connector pin 70 can be located into opposing second and third support junctions 28, 46 (FIG. 1) to accommodate stacking of the second support 14 on top of the first support 12. Similarly, a stake can be inserted through the cannulation 56 for the bottom most set of support junctions (first support junctions 26 in FIG. 1) as will become appreciated from the following discussion.

The first and second apertures 62 and 66 can be configured to snapingly receive male insertion portions 80 on end caps 82 arranged at respective ends 22, 24, 42, 44 of the arms 20 and 40. The end caps 82 can be formed of plastic. In one example, the male insertion portion 80 can comprise a pair of fingers 86 separated by a gap 88. The fingers 86 can collectively form a conical tip 90 having a lip 91. The end cap 82 can have a shaft portion 92 that is configured to be received into a corresponding end 22, 24, 42, 44 of the arms 20 and 40. The conical tip 90 can be inserted into a respective first or second aperture 62, 66 on a support junction 26, 28, 46, 48. It will be appreciated that the fingers 86 may initially deflect toward each other at the gap 88 during insertion into the respective aperture 62, 66 and rebound back to a relaxed position causing the lip 91 to attain a greater diameter than the aperture 62, 66. This action will cause the end cap 82 and associated arm 20, 40 to lock to the support junction 26, 28, 46 and 48. In the locked position, the arm 20, 40 is permitted to rotate about an axis 98 of the male insertion portion 80. A series of insets 93 may be formed on the shaft portion 92. The insets 93 can assist in cooling of the end cap 82 and provide strength.

The connector pin 70 can include a first insertion portion 102 and a second insertion portion 104 separated by a skirt 106. The first and second insertion portions 102 and 106 are configured to be received into a corresponding cannulation 56. The skirt 106 has a greater diameter and can act as a support surface for opposing support junctions such as the second and third support junctions 28, 46 shown in FIG. 1.

The pivot pin 30 can have a shaft portion 120, a head 122 and a male insertion portion 130. In one configuration, the male insertion portion 130 may be constructed similarly to the male insertion portion 80 on the end cap 82. In this regard, the male insertion portion 130 can comprise a pair of fingers 132 separated by a gap 134. The fingers 132 can collectively form a tip 136 having a lip 138. The shaft portion 120 can extend through adjacent midpoint apertures 140 defined into the arms 20. The conical tip 136 can be inserted into the midpoint apertures 140. The fingers 132 may initially deflect toward each other at the gap 134 upon slidable engagement of the conical tip 136 through the midpoint aperture 140. The fingers will subsequently retract after the lip 138 clears the midpoint aperture 140 in an installed position.

Figure 8:
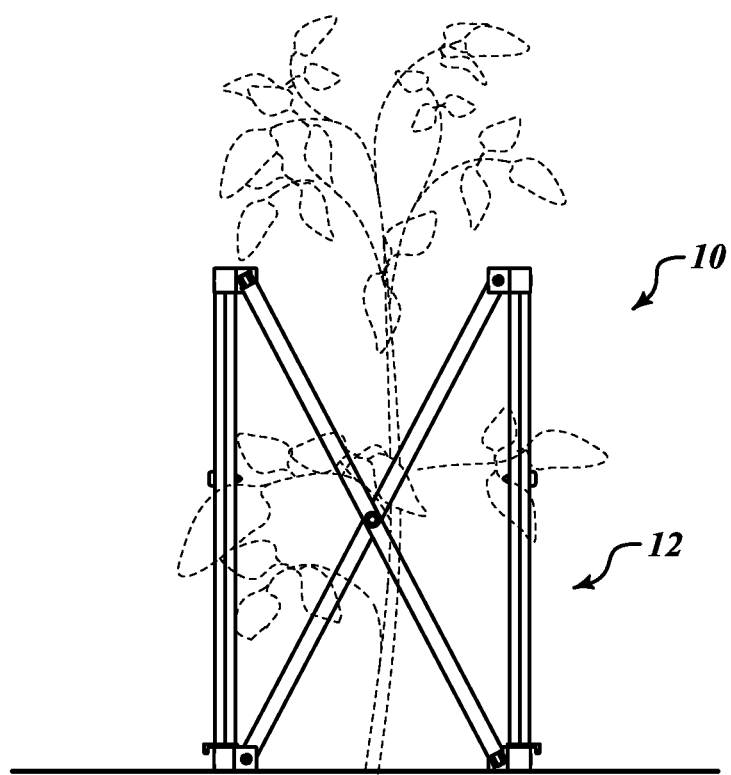
FIG. 8 is a perspective view of a plant support apparatus having a first level of support and shown supporting a tomato plant.
Figure 9:
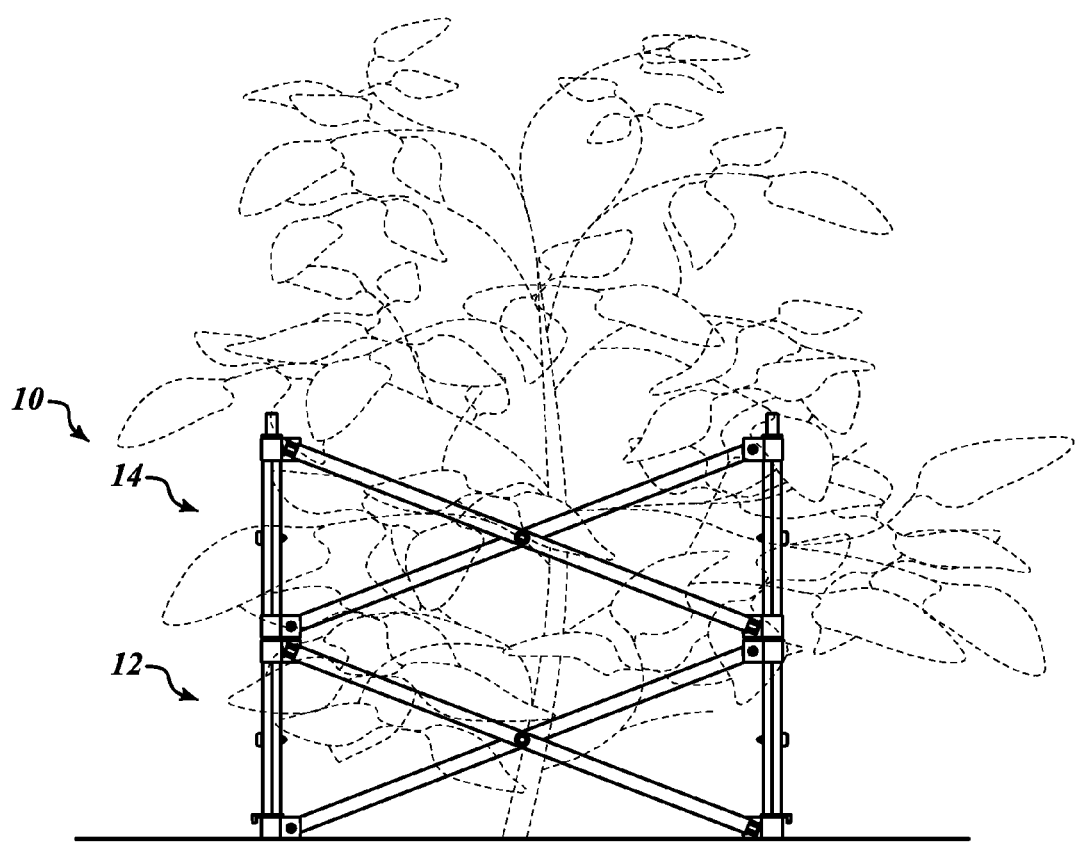
FIG. 9 is a perspective view of a plant support apparatus having a second level of support stacked onto the first support and shown supporting a tomato plant.
Figure 10:
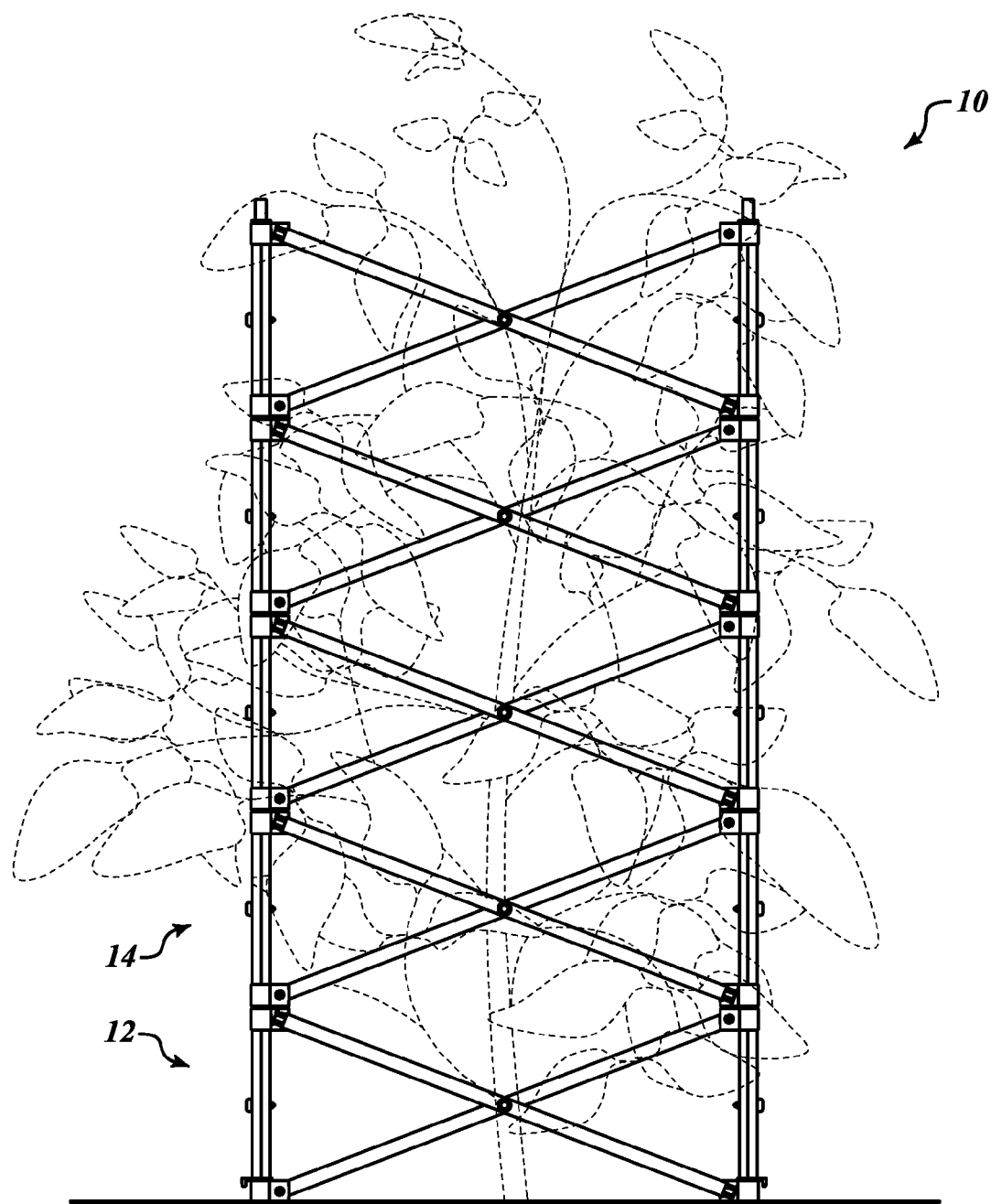
FIG. 10 is a perspective view of the plant support apparatus shown adjusted to accommodate a growing tomato plant.

As viewed in FIGS. 8-10, a second support layer 14 has been added on top of the first support layer 12. As can be seen, the additional supports are used to support the tomato plant as it grows radially and vertically. Specifically, the tomato plant can wrap around or otherwise engage the structure of the plant support apparatus as it grows.

Initially, a user can estimate the size radially of the first support layer 12 around a small plant early in the grow season. The stakes 74 can be passed through the four cannulations 56 of the support junctions 26 and into the ground. If the plant becomes too large for the first support layer 12, a user can stack the second support layer 14 on top of the first support layer 12. Four connector pins 70 can be located into the respective cannulations (see for example the cannulations 56, FIG. 4) of the second support junctions 28. A user may spread the first support layer 12 radially outwardly to a desired size. It will be appreciated that the stakes 74 may also need to be relocated into the ground. During the adjusting, the arms 20 can rotate around the pivot pins 30 while the male insertion portions 80 rotate around respective apertures 62, 66 of the first and second support junctions 26, 28.

Next, a user may locate corresponding cannulations (see for example the cannulations 56, FIG. 4) onto the connector pins 70 extending out of the second support junctions 28. Again, the second support layer 14 may need to be spread radially to match the footprint of the first support layer 12 such that alignment of the second and third support junctions 28 and 46 is attained. While adding a second support layer 14 onto the first support layer 12 has been described above, it will be appreciated that adding subsequent layers on top of the second support layer 14 may be carried out to accommodate a growing plant.

In some examples the plant support apparatus 10 can optionally be adjusted radially at given intervals throughout the growth cycle of the tomato plant. The stakes 74 can be repositioned into the ground as desired. As can be appreciated the respective arms 20 and 40 cooperate with the pivot pins 30 and 50 as well as the support junctions 26, 28, 46 and 48 during adjustment of the plant support apparatus 10. In this regard as the plant support apparatus 10 is manually advanced vertically (relative to the ground), the circumference of the plant support apparatus contracts inwardly.

The foregoing description of the embodiments has been provided for purposes of illustration and description. It is not intended to be exhaustive or to limit the disclosure. Moreover, the various embodiments contain ornamental aspects separate and apart from the functional characteristics described herein. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A plant support apparatus comprising:
   a first support layer comprising;
   a first plurality of pivotable sections comprising pairs of pivotally joined support arms wherein each support arm comprises first ends and second ends, wherein the first ends are pivotally coupled at a corresponding plurality of first support junctions and the second ends are pivotally coupled at a corresponding plurality of second support junctions vertically spaced from said first support junctions;
   a second support layer comprising;
   a second plurality of pivotable sections comprising pairs of pivotally joined support arms wherein each support arm comprises first ends and second ends, wherein the first ends are pivotally coupled at a corresponding plurality of third support junctions and the second ends are pivotally coupled at a corresponding plurality of fourth support junctions vertically spaced from said third support junctions; and
   wherein the first, second, third and fourth support junctions each comprise a main body having a cannulation, a first flange having a first aperture and a second flange having a second aperture;
   a connector pin that is selectively received into corresponding cannulations of the second and third support junctions thereby selectively coupling the second and third support junctions for concurrent movement the connector pin having (i) a first insertion portion received into the cannulation of the second support junction, (ii) a second insertion portion received into the cannulation of the third support junction, and (iii) a skirt having a greater diameter than both of the first and second insertion portions, the skirt engaging and therefore acting as a support surface to opposing and proximate support junctions to accommodate stacking of the first and second support layers on top of each other and supporting the second and third support junctions in a manner where the first and second support layers cooperate and define an enclosure around a plant; and
   an end cap configured at each of the first and second end of each of the first and second support arms, wherein each end cap comprises an integrally formed male insertion portion including a conical tip that is configured to be snapingly received into one of the first and second apertures of a respective first, second, third and fourth support junction.

2. The plant support apparatus of claim 1 wherein the pairs of support arms are formed of natural fiber.

3. The plant support apparatus of claim 1 wherein the first and second flanges are perpendicular to each other.

4. The plant support apparatus of claim 1 wherein the male insertion portion defines an axis and comprises a pair of fingers separated by a gap, the pair of fingers collectively forming a lip at the conical tip, wherein the pair of fingers are configured to initially deflect toward each other at the gap during insertion into the respective apertures and rebound back to a relaxed state causing the lip to attain a greater diameter than the respective apertures and couple the respective support arm to the respective support junction in a locked position, the respective support arm rotatable around the axis in the locked position.

5. A plant support apparatus comprising:
   a first support layer comprising:

a first plurality of pivotable sections comprising pairs of pivotally joined support arms wherein each support arm comprises first ends and second ends, wherein the first ends are pivotally coupled at a corresponding plurality of first support junctions and the second ends are pivotally coupled at a corresponding plurality of second support junctions vertically spaced from said first support junctions;

a second support layer comprising:

a second plurality of pivotable sections comprising pairs of pivotally joined support arms wherein each support arm comprises first ends and second ends, wherein the first ends are pivotally coupled at a corresponding plurality of third support junctions and the second ends are pivotally coupled at a corresponding plurality of fourth support junctions vertically spaced from said third support junctions; and wherein the first, second, third and fourth support junctions each comprise a main body having a cannulation, a first flange having a first aperture and a second flange having a second aperture;

a plurality of connector pins that are cooperatively received by corresponding cannulations of the second and third support junctions each connector pin having (i) a first insertion portion received into the cannulation of the second support junction, (ii) a second insertion portion received into the cannulation of the third support junction, and (iii) a skirt having a greater diameter than both of the first and second insertion portions the skirt engaging and therefore acting as a support surface to opposing and proximate support junctions to accommodate stacking of the first and second support layers on top of each other and supporting the second and third support junctions in a manner where the first and second support layers cooperate to define an enclosure around a plant; and an end cap configured at each of the first and second end of each of the first and second support arms, wherein each end cap comprises an integrally formed male insertion portion including a conical tip that is configured to be snapingly received into one of the first and second apertures of a respective first, second, third and fourth support junction;

wherein the second and third support junctions are selectively coupled for concurrent movement at the connector pins.

6. The plant support apparatus of claim 5, further comprising a plurality of stakes that are selectively received through respective cannulations of the first support junctions.

7. The plant support apparatus of claim 5 wherein the male insertion portion defines an axis and comprises a pair of fingers separated by a gap, the pair of fingers collectively forming a lip at the conical tip, wherein the pair of fingers are configured to initially deflect toward each other at the gap during insertion into the respective apertures and rebound back to a relaxed state causing the lip to attain a greater diameter than the respective apertures and couple the respective support arm to the respective support junction in a locked position, the respective support arm rotatable around the axis in the locked position.

* * * * *